United States Patent [19]

Valka et al.

[11] 4,300,750
[45] Nov. 17, 1981

[54] POSITION INDICATING VALVES

[75] Inventors: William A. Valka, Spring, Tex.; Steven A. Porter, Houston, Tex.

[73] Assignee: Armco Inc., Middletown, Ohio

[21] Appl. No.: 120,048

[22] Filed: Feb. 11, 1980

[51] Int. Cl.³ ............................ F16K 1/36; F16K 1/42
[52] U.S. Cl. ........................................ 251/323; 251/333
[58] Field of Search ............................. 251/321, 323; 137/505.13

[56] References Cited

U.S. PATENT DOCUMENTS 3,488,095 1/1970 Rath .......................... 137/505.13 X

*Primary Examiner*—Arnold Rosenthal
*Attorney, Agent, or Firm*—Roylance, Abrams, Berdo & Farley

[57] ABSTRACT

Indicator valve unit for providing a change in fluid pressure as a remote indication of whether an object occupies a desired position. Particularly useful for indicating whether a component, such as a multiple string tubing hanger, has been properly oriented and landed in an underwater well installation, the indicator valve unit provides for automatic separation of the sensing element of the unit from the sensed object as soon as the valve has been actuated.

6 Claims, 4 Drawing Figures

POSITION INDICATING VALVES

This invention relates to valves for remotely indicating the relative positions of the valve and another object, e.g., a component in an underwater well assembly.

RELATED APPLICATIONS

Subject matter disclosed in this application is also disclosed and claimed in U.S. patent application Ser. Nos. 120,851 and 120,695, filed concurrently herewith by John E. Lawson, and 120,696, filed concurrently herewith by William A. Valka.

BACKGROUND OF THE INVENTION

Particularly in the art of drilling and completing underwater wells, and installing underwater equipment generally, it is frequently necessary to determine the relative positions of two devices. A typical example is the need for determining whether a multiple string tubing hanger installed in the bore of an underwater wellhead body occupies a desired rotational position relative to the wellhead. In the past, such needs have frequently been met by employing a television camera to view the devices and transmit the picture to, e.g., a vessel or other operational base at the surface of the body of water. In some cases, however, the position of the device to be checked is such that television viewing is difficult. In other cases, there is a need for a second remote indication, for redundancy. Prior-art workers have therefore employed position-sensitive valves to provide the remote indication as a change in fluid pressure, as seen for example in U.S. patent application Ser. No. 36,659, filed May 7, 1979, by Michael L. Wilson. Such valves must, however, pass a substantial fluid flow when open, serve when closed to provide a marked change in fluid pressure so as to avoid ambiguity, and be operated by straight line relative movement between the valve and another object, and there has been a continuing need for improvement to satisfy these requirements.

OBJECTS OF THE INVENTION

A general object is to devise a valve of the type described which will satisfactorily handle fluid flow of substantial volume when open, yet close with a positive action in response to relative movement between the valve and another object.

A further object is to provide such a valve which is highly dependable and free from ambiguity in its position-indicating function.

Another object is to provide such a valve which does not require that the valve be brought to an unduly precise position in order to respond to the presence of another object in order to achieve actuation.

SUMMARY OF THE INVENTION

Valves according to the invention comprise a valve body having a longitudinal axis and defining an internal chamber, a cylinder and a guide bore, the chamber being located between the cylinder and the guide bore, the cylinder and bore being coaxial, and the bore opening through one end of the body. A valve seat member is slidably disposed in the guide bore and presents an outwardly facing valve seat, there being means on the valve seat member to engage a stop shoulder on the valve body so that outward movement of the valve seat member relative to the body is limited. The valve seat member has a transverse partition with a central through bore and a plurality of flow passages. A movable valve member is employed which comprises a head and a spindle, the head having a surface shaped and dimensioned to coact with the seat to close the valve against fluid flow through the valve seat members, the spindle projecting from the head through the through bore of the valve seat member, through the internal chamber and into the cylinder. A piston is operatively disposed in the cylinder and secured to the end of the spindle opposite the head. Between the cylinder and the internal chamber, the valve body has a transverse annular shoulder facing the piston to limit downward movement of the piston and movable valve member. Spring means is provided to bias the combination of the movable valve member, with the piston attached thereto, and the valve seat member in a direction such that the valve seat member and piston engage their respective shoulders. An inlet port is provided for supply of pressure fluid to the internal chamber. A seal ring is carried by the piston to seal with the wall of the cylinder, and the valve seat member is also equipped with a seal ring to seal with the wall of the guide bore. The diameter of the valve seat member at its seal ring is slightly but significantly less than the diameter of the piston at its seal ring so that, when the valve is closed, the pressure in the internal chamber acts on an effective piston area which is larger than the effective area of the valve seat member acted on by the same pressure.

In operation, relative movement between the valve body and an object adjacent the head, with the movement being such as to cause the movable head to engage the seat, causes initial closing of the valve against line pressure. Since fluid can no longer escape, and full line pressure remains applied via the inlet port to the internal chamber, the greater effective area of the piston as compared to that of the valve seat member causes the piston to continue its movement and, the piston being rigidly connected to the head of the movable valve member, causes the head to force the valve seat member further inwardly against the biasing force of the spring means. This action not only increases the pressure between the head and valve seat, but also eliminates the need for a precise relationship between the head and the object it is to engage, since the valve head in effect retreats away from the object once the valve has closed. Such retreat of the movable valve member away from the object which was engaged with the head to cause the initial movement also has the advantage of leaving the object in a clearly observable position spaced from the head.

IDENTIFICATION OF THE DRAWINGS

In order that the manner in which the foregoing and other objects are achieved according to the invention can be understood in detail, one particularly advantageous embodiment thereof will be described with reference to the accompanying drawings, which form part of the original disclosure of this application, and wherein.

DETAILED DESCRIPTION OF THE INVENTION

Figure 1:
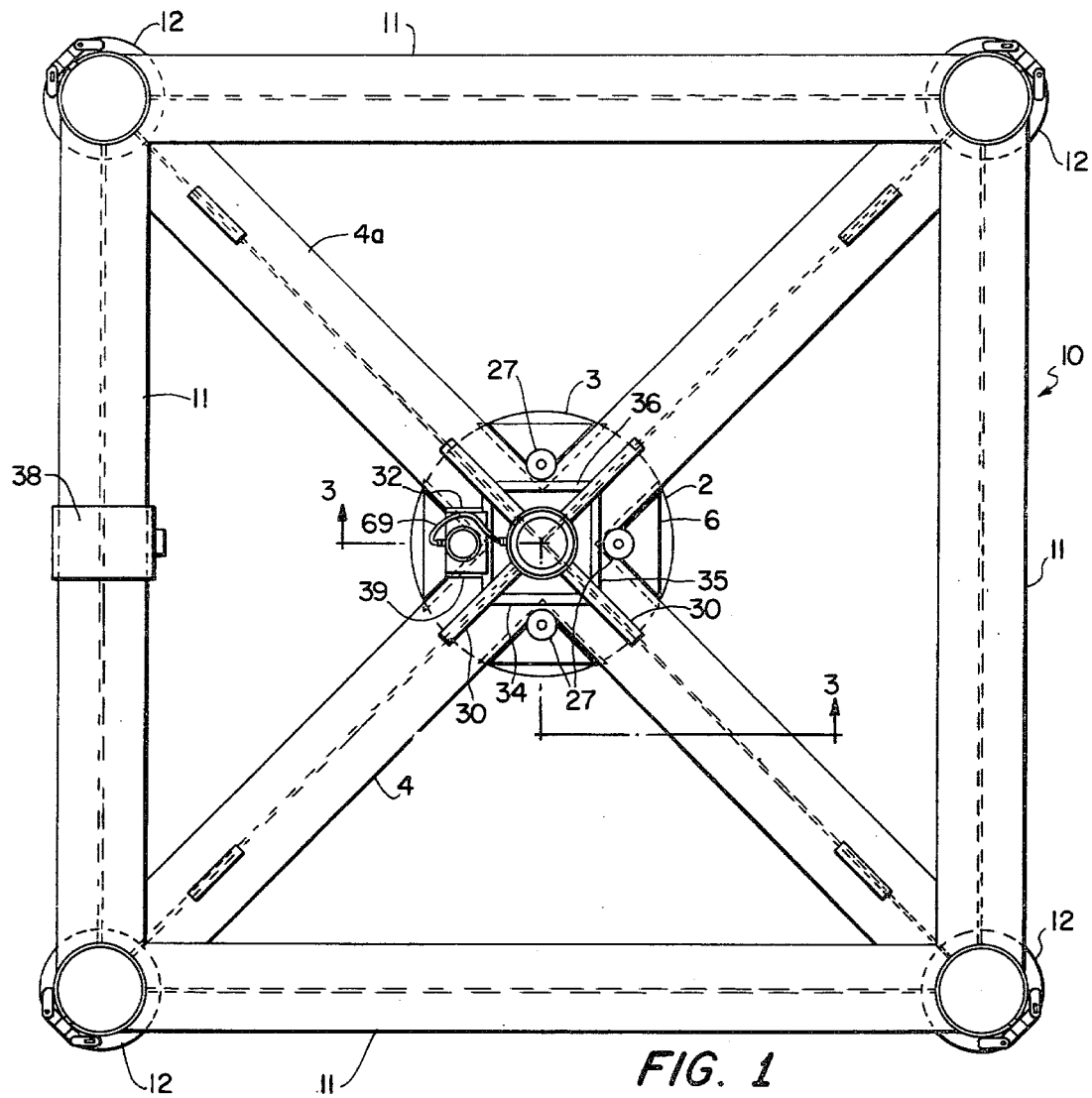
FIGS. 1 and 2 are top plan and side elevational views, respectively, of a tool embodying a valve according to the invention.
Figure 2:
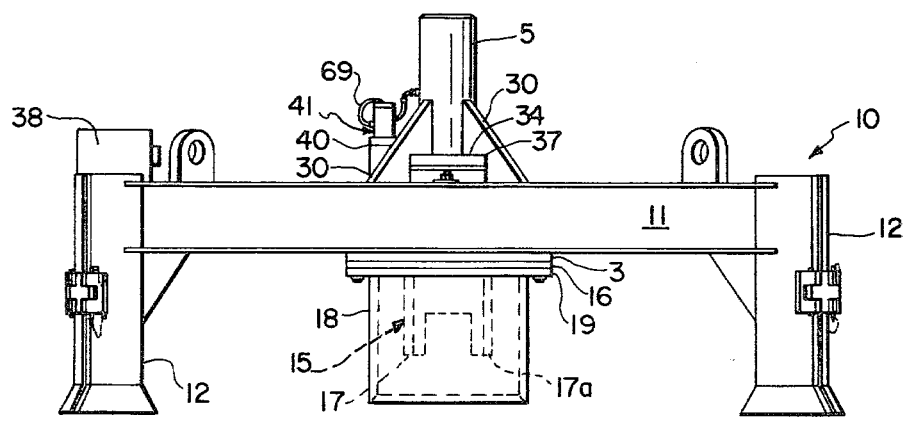

The embodiment of the invention illustrated comprises a support 1 comprising an upper member 2, a lower member 3 and two guide arms 4 and 4a. Upper member 2 comprises an upstanding cylindrical hub 5 and, at the bottom of the hub, a flat transverse flange 6 secured rigidly to the hub. The upper end of the hub has a threaded socket 7, to be connected to a handling string (not shown), the socket opening downwardly into a blind bore 8 which communicates on the one hand with a radial outlet bore 9 and, on the other hand, with the interior of the handling string pipe when the hub is connected to the handling string. Lower member 3 is in the form of a flat plate of circular plan shape.

Guide arms 4 and 4a form part of a guide frame indicated generally at 10 and comprising four side members 11 arranged to define a square, a guide tube 12 being secured at each corner of the square and the guide arms 4, 4a extending along the respective diagonals of the square. Arm 4 extends continuously from corner to corner of the frame, while arm 4a is in two halves, one extending from one corner of the square to the center of arm 4, the other extending from the opposite corner to the center of arm 4. All joints between arms 4, 4a, side members 11 and guide tubes 12 are welded to provide the rigid frame. Arms 4, 4a are of I-beam configuration. Flange 6 of upper member 2 is made up of four triangular pieces welded to the upper flanges of arms 4, 4a at the center of the frame, and lower member 3 is welded to the lower flanges of arms 4, 4a at the center of the frame. Thus, the guide arms effectively extend through the space between flange 6 and member 2.

A locator member 15, comprising a flat circular plate 16 of the same size as lower member 3 and two locator splines 17 and 17a depending from and secured rigidly to plate 16, is employed in conjunction with a locator sleeve or skirt 18 having at its upper end a transverse annular outwardly and inwardly projecting flange 19, the inner diameter of flange 19 being such that the flange snugly embraces splines 17, 17a. Bolts, as at 20, extend through aligned holes in flange 19, plate 16 and member 3, as shown, to secure those members rigidly together with locator member 15 centered on the central axis of hub 5. Splines 17, 17a are of arcuate transverse cross section and are dimensioned to extend downwardly through the respective ones of two gaps of a flange 21 at the upper end of the body of a multiple string tubing hanger 22 supported in the bore of a wellhead lower body 23, the tubing hanger being described in detail in copending application Ser. No. 120,695 filed concurrently herewith by John E. Lawson. As fully explained in that application, the two flange gaps are opposed across the hanger body and are of different arcuate width. Accordingly, spline 17 is made with a width such as to be snugly accommodated by one of the gaps, and flange 17a has a width such as to be snugly accommodated by the other gap. Hence, splines 17, 17a cannot be inserted through the gapped flange 21 of hanger 22 except when locator member 15 is so aligned and oriented relative to the tubing hanger that each spline 17, 17a is centered on its respective gap. Sleeve 18 of member 15 has a right cylindrical inner surface dimensioned to slidably embrace the upper end portion of wellhead lower body 23.

Figure 3:
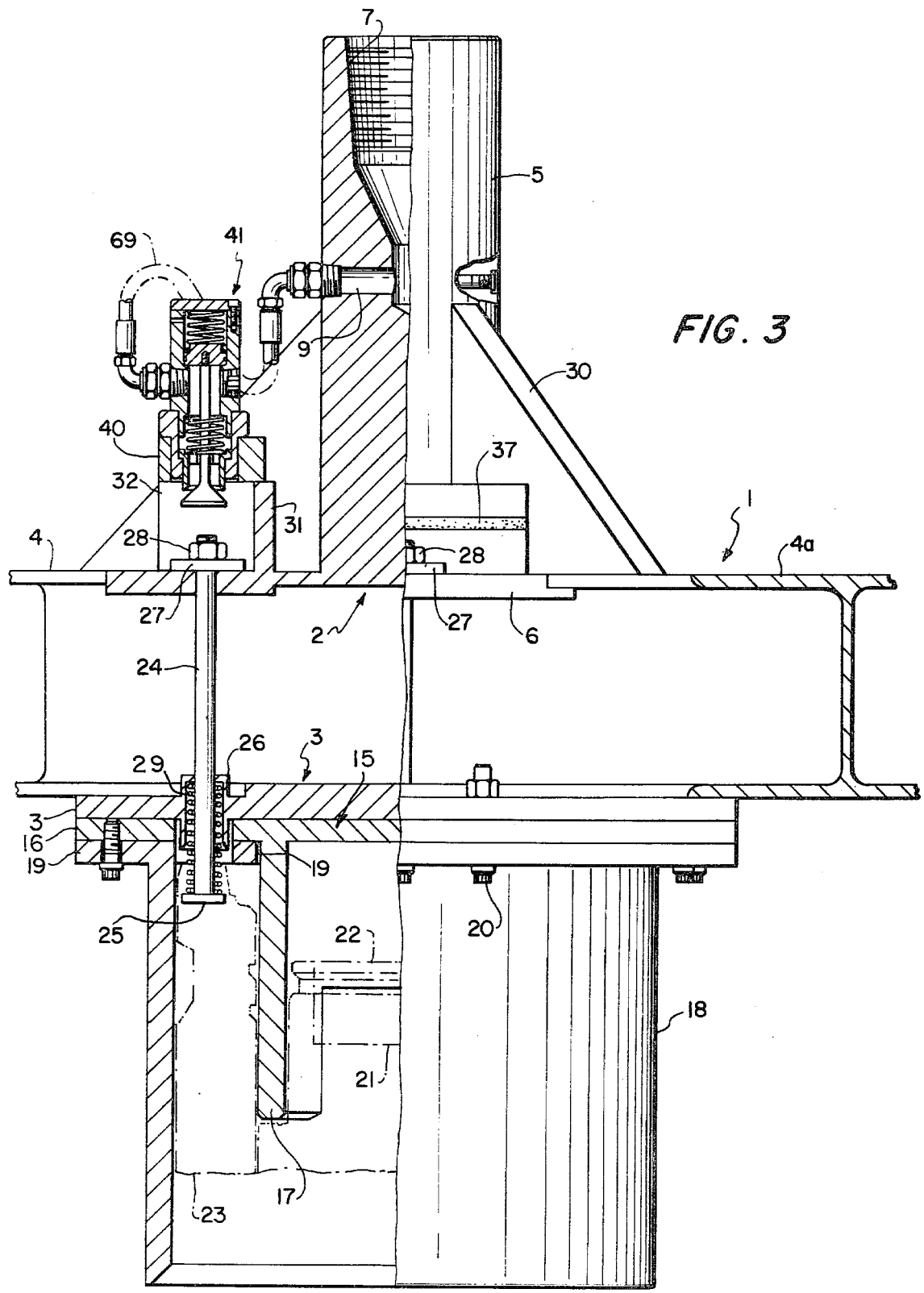
FIG. 3 is a view partly in vertical cross section and partly in side elevation taken generally on line 3—3, FIG. 1, and showing the tool landed on an underwater well assembly and engaged with a multiple string tubing hanger forming part of that assembly.

In locations spaced outwardly from hub 5 and adjacent to the web of one of the guide arms, four sets of vertically aligned openings are provided in flange 19, plate 16, member 3 and flange 6, as seen in FIG. 3. Each such set of openings accommodates a feeler rod, all four feeler rods being identical and one being shown in detail at 24, FIG. 3. At its lower end, the rod has a flat head 25 disposed for flush engagement with the upper end face of wellhead body member 23. Save for its upper tip, which has a threaded portion of smaller diameter, rod 24 is of constant diameter throughout its length and is slidably engaged by the walls of the opening in flange 6 and by an opening in the top wall of a cup-shaped spring retainer 26 carried by member 3, so the rod is retained in an upright position but free to move upwardly or downwardly. The upper end of rod 24 carries a washer 27 secured between a nut 28 and the shoulder (not shown) at the lower end of the smaller diameter threaded tip portion. A compression spring 29 is housed in retainer 26 and engaged between the top wall of the retainer and head 25, so as to bias rod 24 downwardly. The length of the rod between head 25 and washer 27 is predetermined and is significantly greater than the space between the lower end of retainer 26 and the upper surface of flange 6. As will be clear by comparing FIGS. 1 and 3, all of the feeler rods 24 are aligned above the annular space between the inner surface of skirt 18 and a cylindrical surface containing the arcuate outer faces of splines 17, 17a.

Hub 5 and respective guide arms 4, 4a are interconnected by four triangular brace plates 30 each centered on one of guide arms 4, 4a. A shroud is provided for the rod 24 shown in detail in FIG. 3 and comprises a flat background plate 31 and two flat side plates 32, 33 rigidly secured to flange 6 and extending upwardly therefrom. Background plate 31 has its ends welded to two of the brace plates 30 while side plates 32, 33 project outwardly from the background plate and at right angles thereto to define a window through which the background plate can be viewed. Background plates 34–36 are provided, similarly to plate 31, in each of the remaining spaces between adjacent pairs of brace plates 30, as will be clear from FIG. 1. The outwardly exposed face of each background plate 31 and 34–36 is provided with a visible reference line, as at 37, FIG. 3, all of the reference lines lying in a common plane parallel to flange 6 and spaced thereabove by a distance equal to the space between indicator washer 27 and the upper face of flange 6 when the tool is seated on the wellhead assembly with rod heads 25 engaging the upper end of body 23. Thus, when tubing hanger 22 is properly landed and oriented, and when rods 24 are in their raised indicating positions, a television camera 38 will observe washer 27 aligned with reference line 37 on plate 31, the principal axis of the lens being directed to line 37 through the position occupied by washer 27 when the feeler rod is in its indicating position.

Figure 4:
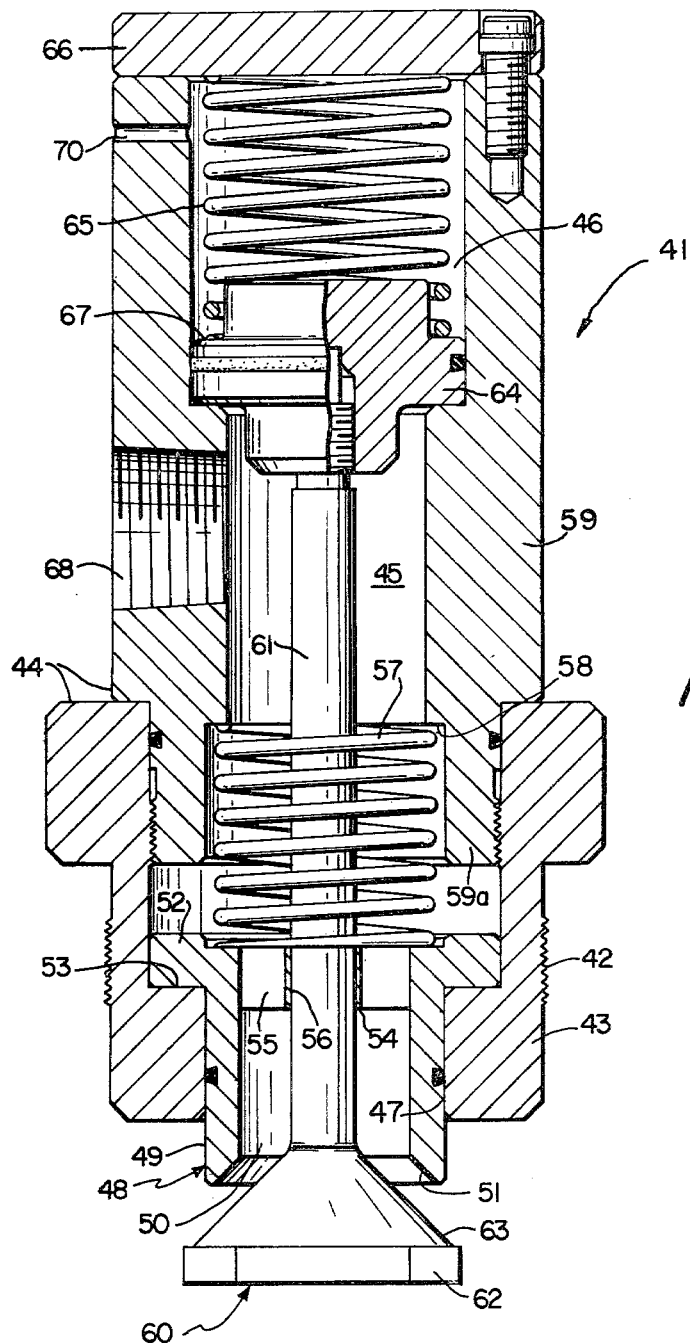
FIG. 4 is a vertical cross-sectional view of a valve unit according to the invention and forming part of the tool of FIGS. 1–3.

Secured to the upper edges of shroud walls 31–33 is a mounting bar 40 having a threaded through bore aligned coaxially with feeler rod 24. An indicator valve unit, indicated generally at 41 in FIG. 3 and shown in detail in FIG. 4, is secured in the through bore of mounting bar 40, as by external threads 42 on lower member 43 of an upright valve body 44. Body 44 is completed by an upper body member 59 and defines a cylindrical internal chamber 45, a cylinder 46 of larger diameter than chamber 45 and located thereabove, and a guide bore 47 located below chamber 45 and of smaller diameter. Chamber 45, cylinder 46 and bore 47 are coaxial. A valve seat member 48 has its right cylindrical outer surface 49 slidably embraced by the wall of bore 47. Member 48 is tubular for most of its length, so as to define an outlet passage 50 terminating in an upwardly and inwardly tapering transverse annular valve seat 51. The upper end of member 48 is outwardly enlarged to provide an outer flange 52 capable of downward engagement with a shoulder 53 provided by body member 43. Also at its upper end, member 48 has a partition 54 with through passages 55 for fluid flow and a central through bore 56. A compression spring 57 is engaged between the upper end of member 48 and a downwardly facing transverse annular shoulder 58 in upper body member 59.

A movable valve member 60 has an elongated spindle 61 and a head portion 62 presenting an upwardly directed frustoconical face 63 dimensioned to mate with valve seat 51. Spindle 61 extends upwardly through bore 56, being slidable with respect thereto, and completely through chamber 45 to terminate in a threaded upper tip engaged in a threaded blind bore in piston 64. Piston 64 has a diameter such as to be slidably embraced by the wall of cylinder 46. Cylinder 46 opens upwardly and is closed by end wall member 66, as shown, a compression spring 65 being engaged between member 66 and an upwardly directed shoulder 67 on the piston. A radial inlet bore 68 extends through the side wall of chamber 45 and is threaded to accept a connector at one end of an external conduit 69, FIG. 1, the other end of conduit 69 being connected to bore 9 of hub 5, placing internal chamber 45 of the valve unit in communication with bore 8 of hub 5 and thus, via the bore of the handling string, with a source of fluid under pressure on the operational base at the surface of the body of water. An outlet or vent 70 is provided for cylinder 46, as shown.

Body members 43, 59 are generally tubular and secured rigidly together, as by a threaded joint between a dependent portion 59a of member 59 and the upper end portion of member 43, as shown. A fluid-tight seal is provided, as by an O-ring, between portion 59a and member 43. Sliding fluid-tight seals are provided between valve seat member 48 and surface 47 of member 43, and between piston 64 and the surrounding cylinder wall, as shown. The guide bore 47 has a diameter significantly smaller than that of the wall of cylinder 46 so that, when the valve is closed, with line pressure still applied via inlet 68 to chamber 45, the pressure in chamber 45 acts against a larger effective area of the piston and a smaller effective area of the valve seat member and the combination of the piston, movable valve member and valve seat member is therefore moved upwardly, as a result of the difference in effective areas, until the valve seat member engages the lower end of body portion 59a.

Valve member 60 is normally in its lower, open position as seen in FIG. 4 so that pressure fluid supplied to chamber 45 at a constant pressure escapes via passages 55 and outlet 50. The greater effective area of piston 64 is not adequate, in view of the strength of springs 57 and 65, to provide a fluid pressure-generated force adequate to move valve member 60 upwardly. Hence, the valve remains open and fluid pressure observed by a gauge (not shown) at the source on the operational base remains steady. When rod 24 is forced upwardly to its indicating position, as a result of engagement with body 23, valve member 60 is moved upwardly to engage surface 63 with seat 51 and force valve seat member 48 slightly upwardly in guide bore 47. With the valve thus closed, and pressure fluid still supplied to chamber 45, the greater effective area of piston 64, as compared to that of a valve seat member 48, provides net force acting on the piston in excess of the spring force, so that the piston, movable valve member and valve seat member move upwardly until the valve seat member engages body portion 59a as a stop. Since fluid can no longer escape and the movable elements are stopped, an abrupt increase in pressure is observed at the operational base, signalling that the tubing hanger is properly landed in its oriented position.

It will be understood that seat 51 and surface 63 are machined to coact in metal-to-metal seal fashion, so that the mechanical action resulting from engagement of valve head 62 with feeler rod 24 is adequate for closing the valve. The increased pressure between surface 63 and seat 51 which results from continued upward movement of the piston, movable valve member and valve seat member against the biasing force of the springs adds to positiveness of closing of the valve but has the greater advantage that, since valve head 62 retreats upwardly from feeler rod 24 after the valve has been closed, there is no need for the high degree of dimensional accuracy which would be required if, once the valve closed, head 62 rigidly opposed the feeler rod.

From FIG. 4, it will be seen that, when the valve is closed, head 62 of the movable valve member is located wholly outside of the valve body. Once the valve has been actuated to close, as a result of engagement of head 62 with the upper end of feeler rod 24, the action of the valve causes head 62 of movable valve member 60 to move upwardly, away from the end of rod 24, so that indicator washer 27 is more clearly distinguishable against background plate 31.

What is claimed is:

1. In a valve for providing a change in fluid pressure as a remote indication of the position of an object, the combination of
   body means defining
     an internal chamber,
     a cylinder,
     a guide bore, and
     a stop shoulder located between the cylinder and the chamber and facing away from the chamber,
     the chamber being located between and communicating with the cylinder and the guide bore,
     the guide bore opening outwardly of the body means and being coaxial with the cylinder,
     there being an inlet port opening into the chamber and via which fluid under pressure can be supplied to the chamber;
   a valve seat member having
     a generally tubular portion slidably engaged in the guide bore of the body means and having at one end a transverse annular valve seat facing outwardly away from the chamber, and
     a transverse portion spaced inwardly from the valve seat and extending across the interior of the tubular portion of the valve seat member, the transverse portion having a central axial through bore and flow passage means via which fluid can flow from the internal chamber and through the valve seat member to discharge via the valve seat;
   a movable valve member comprising a head having a valve surface of such dimensions and configuration as to be capable of engaging the valve seat to prevent flow of fluid through the valve seat member, and an elongated spindle secured at one end to the head and projecting away from the valve surface, the spindle and valve surface being coaxial, the movable valve member being arranged with the spindle extending through the axial through bore of the transverse portion of the valve seat member and through the internal chamber, the head being located with its valve surface outwardly of and facing toward the valve seat;

a piston operatively disposed in the cylinder and secured to the other end of the spindle of the movable valve member;

spring means engaged between the piston and body means and biasing the piston into engagement with the stop shoulder;

stop means comprising coacting parts carried by the valve seat member and the body means and disposed to limit outward movement of the valve seat member relative to the body means; and biasing means yieldably biasing the valve seat member outwardly to cause the stop means to be engaged, the piston having a larger effective area exposed to pressure in the internal chamber than does the valve seat member when the valve is closed.

2. The combination defined in claim 1, wherein said stop shoulder surrounds the opening between the cylinder and the internal chamber; and the length of the spindle is such that, when the piston engages the stop shoulder, the head of the movable valve member is wholly outside of the body means.

3. The combination defined in claim 1, wherein the last-mentioned biasing means comprises a compression spring engaged between a shoulder on the body means and the inner end of the valve seat member.

4. The combination defined in claim 1, wherein the body means comprises a first generally tubular member defining the guide bore, a second generally tubular body member defining the cylinder, the first and second body members being rigidly secure to each other, the cylinder opening outwardly through the end of the second body member which is directed away from the first body member, and a closure member secured to said end of the second body member to close the cylinder.

5. The combination defined in claim 4, wherein the stop means comprises a first transverse annular shoulder presented by the first body member and directed toward the second body member, and an outwardly projecting flange on the valve seat member.

6. The combination defined in claim 5, wherein the last mentioned biasing means comprises a compression spring engaged between the flange of the valve seat member and an opposing shoulder presented by the second body member.

* * * * *